US009952629B2

(12) United States Patent
Chae et al.

(10) Patent No.: US 9,952,629 B2
(45) Date of Patent: Apr. 24, 2018

(54) ELECTRONIC DEVICE, USER INTERFACE METHOD IN THE ELECTRONIC DEVICE, AND COVER OF THE ELECTRONIC DEVICE

(71) Applicant: Samsung Electronics Co., Ltd., Gyeonggi-do (KR)

(72) Inventors: Soo-Hak Chae, Jeollabuk-do (KR); Jae-Ho Kim, Jeollabuk-do (KR); Saet-Byeol Lee, Jeollabuk-do (KR); Jae-Yup Hwang, Chungcheongnam-do (KR)

(73) Assignee: Samsung Electronics Co., Ltd (KR)

( * ) Notice: Subject to any disclaimer, the term of this patent is extended or adjusted under 35 U.S.C. 154(b) by 374 days.

(21) Appl. No.: 14/726,781

(22) Filed: Jun. 1, 2015

(65) Prior Publication Data
US 2015/0346779 A1    Dec. 3, 2015

(30) Foreign Application Priority Data

May 30, 2014   (KR) .................. 10-2014-0066382

(51) Int. Cl.
*G06F 1/16*    (2006.01)
*G06F 3/0488*  (2013.01)
(Continued)

(52) U.S. Cl.
CPC .......... *G06F 1/1677* (2013.01); *G06F 1/1626* (2013.01); *G06F 1/1643* (2013.01);
(Continued)

(58) Field of Classification Search
CPC ... G06F 2203/04809; G06F 2200/1634; G06F 1/1677
See application file for complete search history.

(56) References Cited

U.S. PATENT DOCUMENTS

| 7,277,081 | B2 * | 10/2007 | Ukita | ................... G06F 1/1616 345/156 |
| 2002/0054030 | A1 * | 5/2002 | Murphy | ................ G06F 1/1626 345/173 |

(Continued)

FOREIGN PATENT DOCUMENTS

| KR | 1020050072575 | 7/2005 |
| KR | 1020100116084 | 10/2010 |
| KR | 1020130078268 | 7/2013 |

OTHER PUBLICATIONS

Smith, "Video: Awesome accessory puts transparent physical keyboard on your iPad's screen," Apr. 18, 2014, http://bgr.com/2014/04/18/ipad-transparent-keyboard-accessory/.*

*Primary Examiner* — Ryan Barrett
(74) *Attorney, Agent, or Firm* — The Farrell Law Firm, P.C.

(57) ABSTRACT

Disclosed are an electronic device, a User Interface (UI) method in the electronic device, and a cover of the electronic device. The electronic device includes a touch screen, and a controller configured to determine whether a cover covers the touch screen, to define a first area and a second area on the touch screen respectively in correspondence with a window area and a keyboard area of the cover, when the cover covers the touch screen, and to control display of a keypad related to contents displayed in the first area in the second area.

18 Claims, 13 Drawing Sheets

(51) Int. Cl.
*H04M 1/02* (2006.01)
*H04M 1/23* (2006.01)

(52) U.S. Cl.
CPC ........ *G06F 3/04886* (2013.01); *H04M 1/23* (2013.01); *G06F 2200/1633* (2013.01); *G06F 2200/1634* (2013.01); *G06F 2203/04809* (2013.01); *H04M 1/0214* (2013.01); *H04M 2250/12* (2013.01); *H04M 2250/22* (2013.01)

(56) References Cited

U.S. PATENT DOCUMENTS

| | | | | |
|---|---|---|---|---|
| 2004/0212598 | A1* | 10/2004 | Kraus | B41J 5/102 345/168 |
| 2004/0248621 | A1* | 12/2004 | Schon | G06F 1/1616 455/566 |
| 2006/0022956 | A1* | 2/2006 | Lengeling | G06F 3/04847 345/173 |
| 2006/0256090 | A1* | 11/2006 | Huppi | A63F 13/02 345/173 |
| 2007/0222765 | A1* | 9/2007 | Nyyssonen | G06F 1/1607 345/173 |
| 2009/0315832 | A1* | 12/2009 | Gray | G06F 3/04886 345/169 |
| 2010/0238119 | A1* | 9/2010 | Dubrovsky | G06F 1/1626 345/169 |
| 2010/0315348 | A1* | 12/2010 | Jellicoe | G06F 3/041 345/173 |
| 2011/0035695 | A1* | 2/2011 | Fawcett | G06F 1/1632 715/773 |
| 2011/0181514 | A1* | 7/2011 | Aboulhosn | G06F 3/04886 345/169 |
| 2011/0241999 | A1* | 10/2011 | Thier | G06F 3/023 345/168 |
| 2011/0260980 | A1* | 10/2011 | Palacios | G06F 3/04886 345/168 |
| 2012/0212430 | A1* | 8/2012 | Jung | G06F 1/1626 345/173 |
| 2012/0287051 | A1* | 11/2012 | Takabu | G06F 3/0202 345/169 |
| 2012/0328349 | A1* | 12/2012 | Isaac | G06F 3/04886 400/491 |
| 2013/0328825 | A1* | 12/2013 | Brown | G06F 3/01 345/174 |
| 2013/0335327 | A1* | 12/2013 | Solomon | G06F 1/1662 345/168 |
| 2014/0274214 | A1* | 9/2014 | Kim | H04M 1/0266 455/566 |
| 2015/0155903 | A1* | 6/2015 | Jang | H04B 1/3888 455/575.8 |
| 2015/0229754 | A1* | 8/2015 | Won | G06F 1/165 455/575.8 |
| 2015/0234591 | A1* | 8/2015 | Park | G06F 1/1626 345/173 |
| 2015/0280770 | A1* | 10/2015 | Rhee | H04B 1/3888 455/575.8 |

* cited by examiner

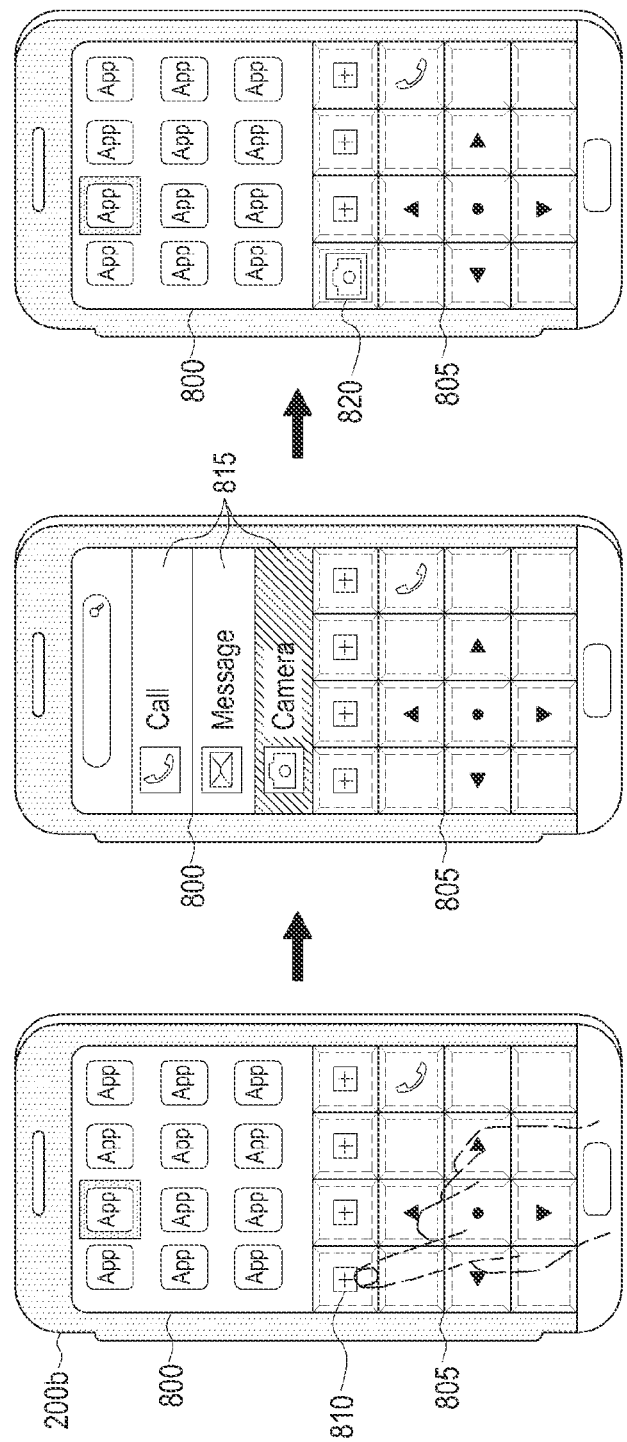

ELECTRONIC DEVICE, USER INTERFACE METHOD IN THE ELECTRONIC DEVICE, AND COVER OF THE ELECTRONIC DEVICE

PRIORITY

This application claims priority under 35 U.S.C. § 119(a) to a Korean Patent Application filed in the Korean Intellectual Property Office on May 30, 2014 and assigned Serial No. 10-2014-0066382, the contents of which are incorporated herein by reference.

BACKGROUND OF THE INVENTION

1. Field of the Invention

The present invention relates generally to an electronic device, a User Interface (UI) method in the electronic device, and a cover of the electronic device.

2. Description of the Related Art

An increasing number of services and additional functions have recently become available through electronic devices. To increase the utilization of these electronic devices and satisfy various users' demands, many applications are under development for execution in the electronic devices. Accordingly, a number of applications are stored in an electronic device such as a smartphone and a tablet Personal Computer (PC), and shortcut keys are displayed in the form of icons on the touch screen of the electronic device in order to execute the applications. A user may execute an intended application in the electronic device by touching one of the displayed icons.

A protection cover matching the exterior of an electronic device is provided for the purpose of protecting the electronic device against external impact or foreign materials. The protection cover also serves as an accessory that can be personalized. The protection cover is fabricated to have the same dimensions as the exterior of the electronic device and is configured so as to cover an entire display formed on the front of the electronic device.

However, the conventional protection cover is inconvenient for fast manipulation of the electronic device. That is, the protection cover compromises ease of use of the electronic device. As a consequence, the user's demands for various usages of the electronic device may not be met.

Accordingly, there is a need in the art for an improved protection cover for an electronic device.

SUMMARY OF THE INVENTION

The present invention has been made to address at least the above-mentioned problems and/or disadvantages and to provide at least the advantages described below. Accordingly, an aspect of the present invention is to provide a UI method in an electronic device and a cover of the electronic device, which enable a user to view at least a part of a display screen of the electronic device and to apply an input, even though the electronic device is covered with the cover.

Another aspect of the present invention is to provide a UI method in an electronic device and a cover of the electronic device, which enable a user to manipulate an application executed on a display screen, while the electronic device is covered with the cover.

In accordance with an aspect of the present invention, there is provided an electronic device including a touch screen, and a controller configured to determine whether a cover covers the touch screen, to define a first area and a second area on the touch screen respectively in correspondence with a window area and a keyboard area of the cover, when the cover covers the touch screen, and to control display of a keypad related to contents displayed in the first and second areas.

In accordance with another aspect of the present invention, there is provided a cover of an electronic device, including a front cover unit configured to cover a touch screen formed on a front surface of the electronic device, and a rear cover unit configured to cover a rear surface of the electronic device. The front cover unit includes a transparent or semi-transparent window area and a keyboard area formed of a transparent material, and with the front cover unit covering the touch screen of the electronic device, the keyboard area includes square grids in which a keypad of the electronic device is projected.

In accordance with another aspect of the present invention, there is provided a UI method in an electronic device, including determining whether a cover covers a touch screen of the electronic device, defining a first area and a second area on the touch screen respectively in correspondence with a window area and a keyboard area of the cover, when the cover covers the touch screen, and displaying a keypad related to contents displayed in the first area in the second area.

BRIEF DESCRIPTION OF THE DRAWINGS

The above and other aspects, features and advantages of certain embodiments of the present invention will be more apparent from the following description taken in conjunction with the accompanying drawings, in which:

FIGS. 8A, 8B and 8C illustrate a screen for setting a hot key according to embodiments of the present invention;

Throughout the drawings, like reference numerals will be understood to refer to like parts, components, and structures.

DETAILED DESCRIPTION OF EMBODIMENTS OF THE INVENTION

Figure 1A:
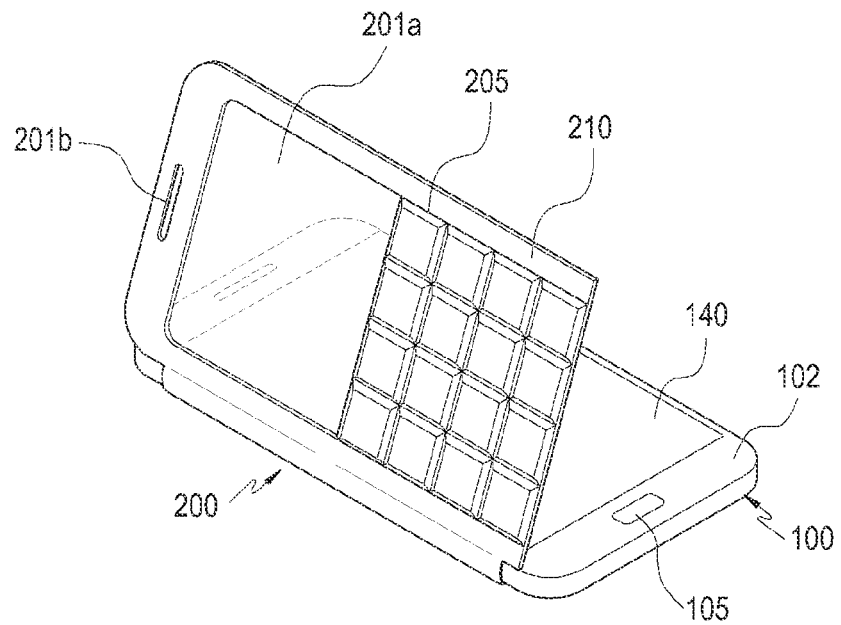
FIGS. 1A and 1B are exterior perspective views of an electronic device connected with a cover according to embodiments of the present invention.

The following description with reference to the accompanying drawings is provided to assist in a comprehensive understanding of embodiments of the present invention as defined by the claims and their equivalents. Those of ordinary skill in the art will recognize that various changes and modifications of the embodiments described herein can be made without departing from the scope and spirit of the present invention. Descriptions of well-known functions and constructions may be omitted for the sake of clarity and conciseness.

The terms and words used in the following description and claims are not limited to their dictionary meanings, but, are merely used to enable a clear and consistent understanding of the present invention. Accordingly, it should be apparent to those skilled in the art that the following description of embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present invention, an electronic device may be a device that is equipped with a display such as a touch screen, and that is covered with a cover. The term 'electronic device' may be replaced with terminal, portable terminal, mobile terminal, communication terminal, portable communication terminal, portable mobile terminal, and display device, for example.

An electronic device may be, for example, a smartphone, a portable phone, a navigation device, a game console, a TeleVision (TV), a laptop computer, a desktop computer, a tablet, a Portable Media Player (PMP), or a Personal Digital Assistant (PDA). An electronic device may be implemented as a pocket-sized portable communication terminal having wireless communication functionalities, and may be a flexible device or a flexible display device.

An electronic device communicates with an external electronic device such as a server, or operates in conjunction with the external device. For example, the electronic device transmits an image captured by a camera and/or location information detected through a sensor unit to the server through a network. The network may be, but is not limited to, a mobile or cellular communication network, a Local Area Network (LAN), a Wireless LAN (WLAN), a Wide Area Network (WAN), the Internet, and a Small Area Network (SAN).

Figure 1B:
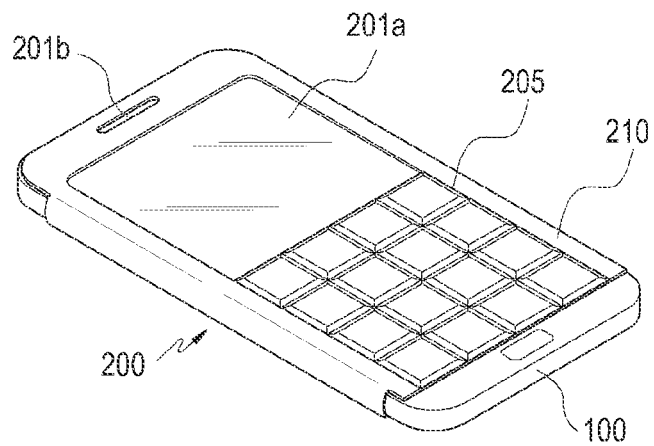

FIGS. 1A and 1B are exterior perspective views of an electronic device connected with a cover according to embodiments of the present invention.

Referring to FIGS. 1A and 1B, an electronic device 100 is connected with a cover 200. A display device that displays screens for multiple functions, for example, a touch screen 140 is provided on a front surface of the electronic device 100. A bezel 102 is formed around at least a part of the periphery of the touch screen 140 on the front surface of the electronic device 100. For example, a home button 105, a speaker, a camera, and a sensor may be formed in the bezel 102.

The cover 200 is configured to cover at least a part of the front surface of the electronic device 100. When the cover 200 covers the front surface of the electronic device 100, a front cover unit 210 of the cover 200 covers at least a part of the touch screen 140, and when the cover 200 covers the front surface of the electronic device 100, the front cover unit 210 covers at least a part of the bezel 102. If the front cover unit 210 of the cover 200 is closed, a component (for example, the home button 105) formed in the bezel 102 of the electronic device 100 is outwardly exposed.

When the front cover unit 210 covers at least a part of the touch screen 140, a partial area of the touch screen 140 is outwardly exposed through a screen projector (referred to as a window area) 201a formed on the front cover unit 210. The electronic device 100 controls display of content such as a clock, characters, a caller number, and a set user environment as well as an execution screen of an application in the partial area of the touch screen 140 exposed through the window area 201a of the front cover unit 210.

The front cover unit 210 of the cover 200 may be flipped open or closed. When the front cover unit 210 of the cover 200 is opened, the entire area of the touch screen 140 in the electronic device 100 is outwardly exposed, as illustrated in FIG. 1A. However, if the front cover unit 210 of the cover 200 is closed, at least a part of the touch screen 140 in the electronic device 100 is covered with the front cover unit 210, as illustrated in FIG. 1B.

Referring to FIG. 1B, when the front cover unit 210 of the cover 200 is closed, at least a part of the touch screen 140 corresponding to the window area 201a is outwardly exposed and projected by a keyboard screen projector (referred to as a keyboard area) 205 formed on the front cover unit 210. The part of the touch screen 140 is projected in correspondence with the keyboard area 205 of the front cover unit 210. This keyboard area 205 is formed of a transparent material so that a screen of the touch screen 140 is projected. Since the keyboard area 205 is touchable by a user's finger for a key input, the keyboard area 205 is formed of a flexible material, such as transparent silicon.

A plurality of squares is defined in the keyboard area 205, in the same shape of button keys. According to embodiments of the present invention, the squares are arranged in a 4×4 layout in the keyboard area 205, by way of example. However, the squares may be arranged in many other layouts including a 3×4 layout in the keyboard area 205.

According to embodiments of the present invention, the electronic device 100 controls display of an execution screen of an application on a part of the touch screen 140 exposed through the window area 201a of the front cover unit 210 and may also control display of a keypad supporting the application in an area of the touch screen 140 corresponding to the keyboard area 205 of the front cover unit 210. Accordingly, keypads supporting various applications are provided and a user may use an application by touching a keypad of the touch screen 140 projected in the keyboard area 205 in the same manner as a key button pressing-based input scheme. Specifically, if the user presses an intended area among areas corresponding to protruding keys of the keypad projected in the keypad area 205, a key input corresponding to the pressed area is provided to the touch screen 140 through the flexible material of the keyboard area 205. Thus the key input may be regarded as a touch input.

When the front cover unit 210 of the cover 200 is closed, a component (for example, a speaker) formed in the bezel 102 of the electronic device 100 is outwardly exposed through an opening 201b formed in the front cover unit 210. While only one opening 201b is shown in FIG. 1B, a plurality of openings may be formed in the front cover unit 210 so that even though the front cover unit 210 is closed, several components (for example, a speaker and a camera) formed in the bezel 102 are outwardly exposed through the plurality of openings.

Figure 2A:
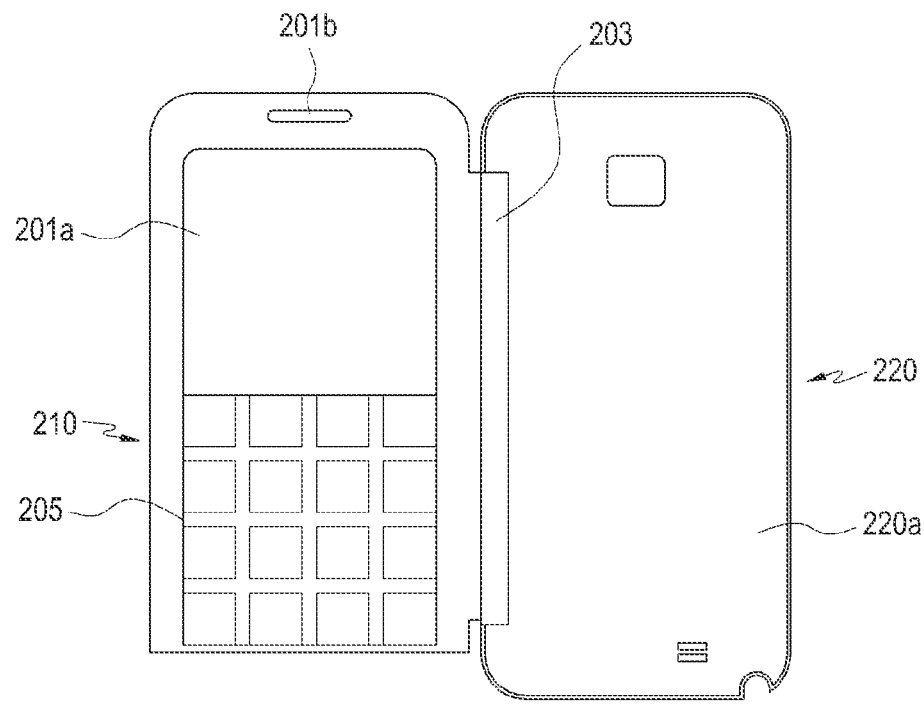
FIG. 2A illustrates a cover of an electronic device according to embodiments of the present invention.
Figure 2B:
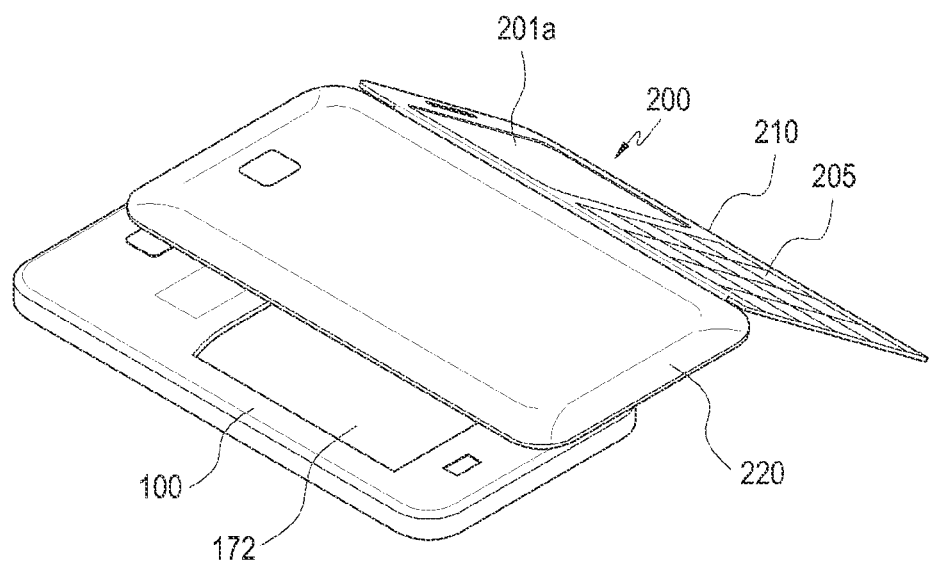
FIG. 2B illustrates the rear of a cover of an electronic device according to embodiments of the present invention.

FIG. 2A illustrates a cover of an electronic device according to embodiments of the present invention, and FIG. 2B illustrates the rear of a cover of an electronic device according to embodiments of the present invention.

Referring to FIGS. 2A and 2B, the cover 200 includes the front cover unit 210 and a rear cover unit 220. The cover 200 further includes a connection unit 203 interposed between the front cover unit 210 and the rear cover unit 220, for connecting the front cover unit 210 to the rear cover unit 220. The connection unit 203 covers a part of a side surface of the electronic device 100. In this case, one side surface of the connection unit 203 is connected to one side surface of the rear cover unit 220, while the other side surface of the connection unit 203 is connected to one side surface of the front cover unit 210. The rear cover unit 220 and the front cover unit 210 may be bent upon the connection unit 203. With a battery cover 220a connected with the rear surface of the electronic device 100, substituting the battery cover of the electronic device 100, the electronic device 100 is inserted into the rear cover unit 220.

The front cover unit 210 covers the front surface of the electronic device 100 and includes the window area 201a to expose a part of the touch screen 140. The window area 201a is formed of a transparent or semi-transparent material or is formed into an opening in a part of the front cover unit 210 so that when the cover 200 covers the front surface of the electronic device 100, the user may view information displayed on the touch screen 140 through the window area 201a. For example, the window area 201a is formed of a transparent or semi-transparent film or is formed into an opening by cutting out a part of the front cover unit 210. Accordingly, the user may view information displayed on the touch screen 140 inside the front cover unit 210 through the window area 201a from the outside of the front cover unit 210.

The information displayed on the touch screen 140 as viewed through the window area 201a includes, for example, at least one of a screen of launcher applications, an application execution screen, a locking screen, and an incoming or outgoing call screen. Therefore, even though the front cover unit 210 is closed, the user may view an execution state of an application displayed on the touch screen 140 through the window area 201a and may enter a user command in the keyboard area 205 of the front cover unit 210 to execute a function related to the displayed application.

The rear cover unit 220 is formed as a battery cover in FIG. 2B, by way of example. Referring to FIG. 2B, the rear cover unit 220 covers the rear surface of the electronic device 100 and is fixedly or detachably mounted on the rear surface of the electronic device 100. A battery 172 is detachably inserted in the rear surface of the electronic device 100 and the rear cover unit 220 is configured so as to cover the battery 172 and the rear surface of the electronic device 100. The rear cover unit 220 is connected with the rear surface of the electronic device 100. When the front cover unit 210 is flipped closed, the rear cover unit 220 surrounds at least a part of one side surface of the electronic device 100. Thus, the electronic device 100 does not separate from the cover 200.

Figure 3:
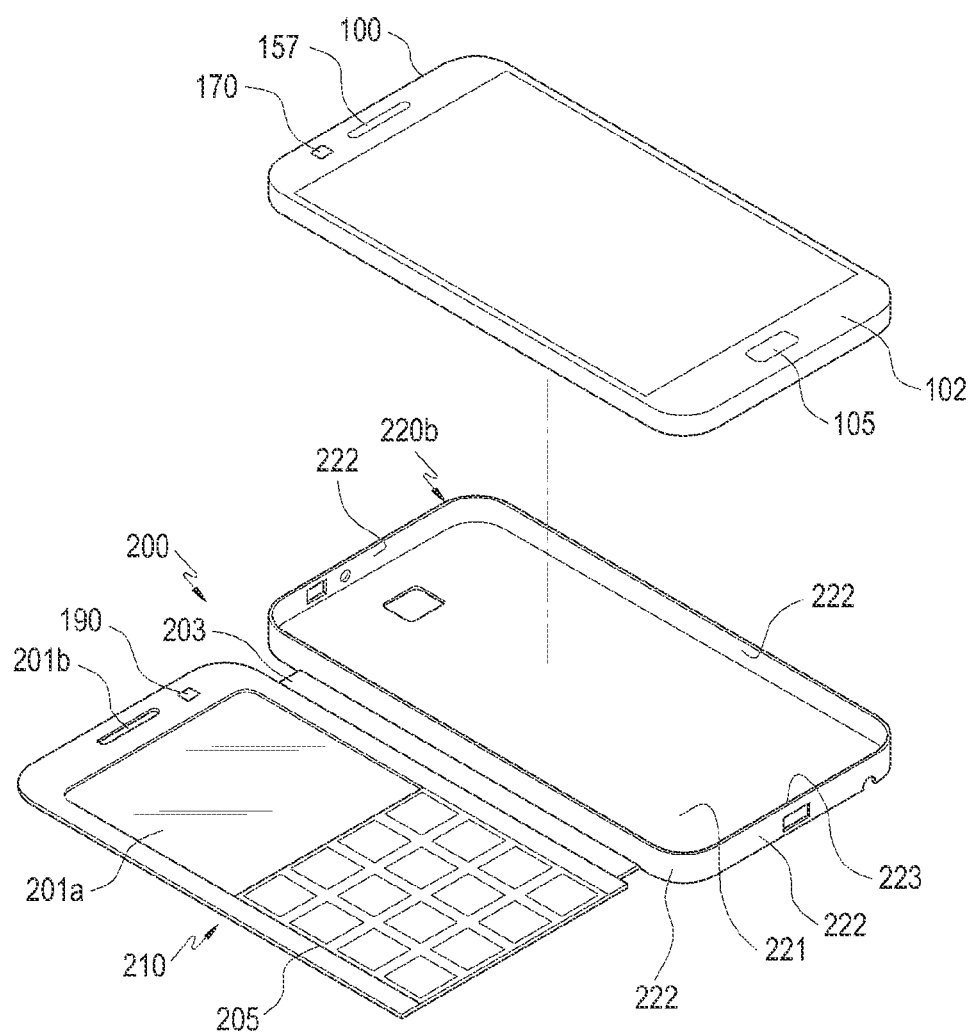
FIG. 3 illustrates an electronic device and a cover according to embodiments of the present invention.

FIG. 3 illustrates a cover of an electronic device according to another embodiment of the present invention.

In FIG. 3, the rear cover unit 220 is formed as a rear case 220b. Referring to FIG. 3, the cover 200 includes the front cover unit 210, the connection unit 203, and the rear case 220b. The electronic device 100 is fixedly inserted in the rear case 220b. The electronic device 100 with a battery cover connected with its rear surface may be inserted in the rear case 220b.

The rear case 220b includes a base 221, at least one sidewall 222 formed along the periphery of the base 221, and a catching portion 223. The at least one sidewall 222 is formed on the base 221 at about a 90 degree angle upwards from the base 221. A bottom of the at least one sidewall 220 is connected to the base 221 and the catching portion 223 is formed at an upper end of the at least one sidewall 222. For example, the catching portion 223 may correspond to the upper end of the sidewall 222 and may protrude inward in an inner space defined by the base 221 and the at least one sidewall 222.

With the at least one sidewall 222 flexibly spread outward, the electronic device 100 is inserted in the rear case 220b and then caught by the catching portion 223 at a front periphery of the electronic device 100. The inner space defined by the base 221 and the at least one sidewall 222 has a size and a shape matching the size and shape of the electronic device 100. When the electronic device 100 is accommodated in the inner space, the catching portion 223 prevents the electronic device 100 from separating from the inner space. The front cover unit 210 is connected at one side of the rear case 220b.

When the window area 201a and the keyboard area 205 are formed at predetermined positions on the front cover unit 210 of the cover 200, when the cover 200 is closed, the electronic device 100 displays information about an application through the window area 201a and receive a user input through the keyboard area 205. According to embodiments of the present invention, with the touch screen 140 of the electronic device 100 covered with the cover 200, the user may input characters and numerals as in a general keypad, and when the cover 200 is open, the user may apply a touch input to the touch screen 140.

A keypad projected in the keyboard area 205 includes keys needed to execute an application displayed in the window area 201a in embodiments of the present invention. That is, the keypad projected in the keyboard area 205 has varying configurations depending on an executed application.

While it has been described above with reference to FIG. 3 that the rear cover unit 220 of the cover 200 is configured as a case, the shapes of the rear cover unit 220 and the connection unit 203 may be different as long as the front cover unit 210 can be detachably mounted to the electronic device 100 and flipped open or closed.

Figure 4:
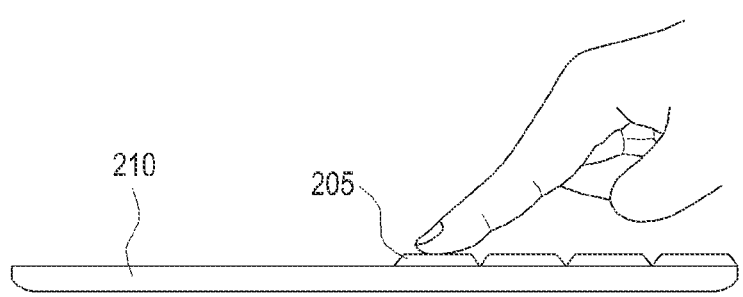
FIG. 4 is a side view of a cover of an electronic device according to embodiments of the present invention.

FIG. 4 is a side view of a cover of an electronic device according to embodiments of the present invention.

Referring to FIG. 4, the keyboard area 205 is defined on the front cover unit 210. Areas corresponding to respective keys in the keyboard area 205 protrude from the front cover unit 210, and are formed into square grids in order to facilitate finger pressing.

Figure 5:
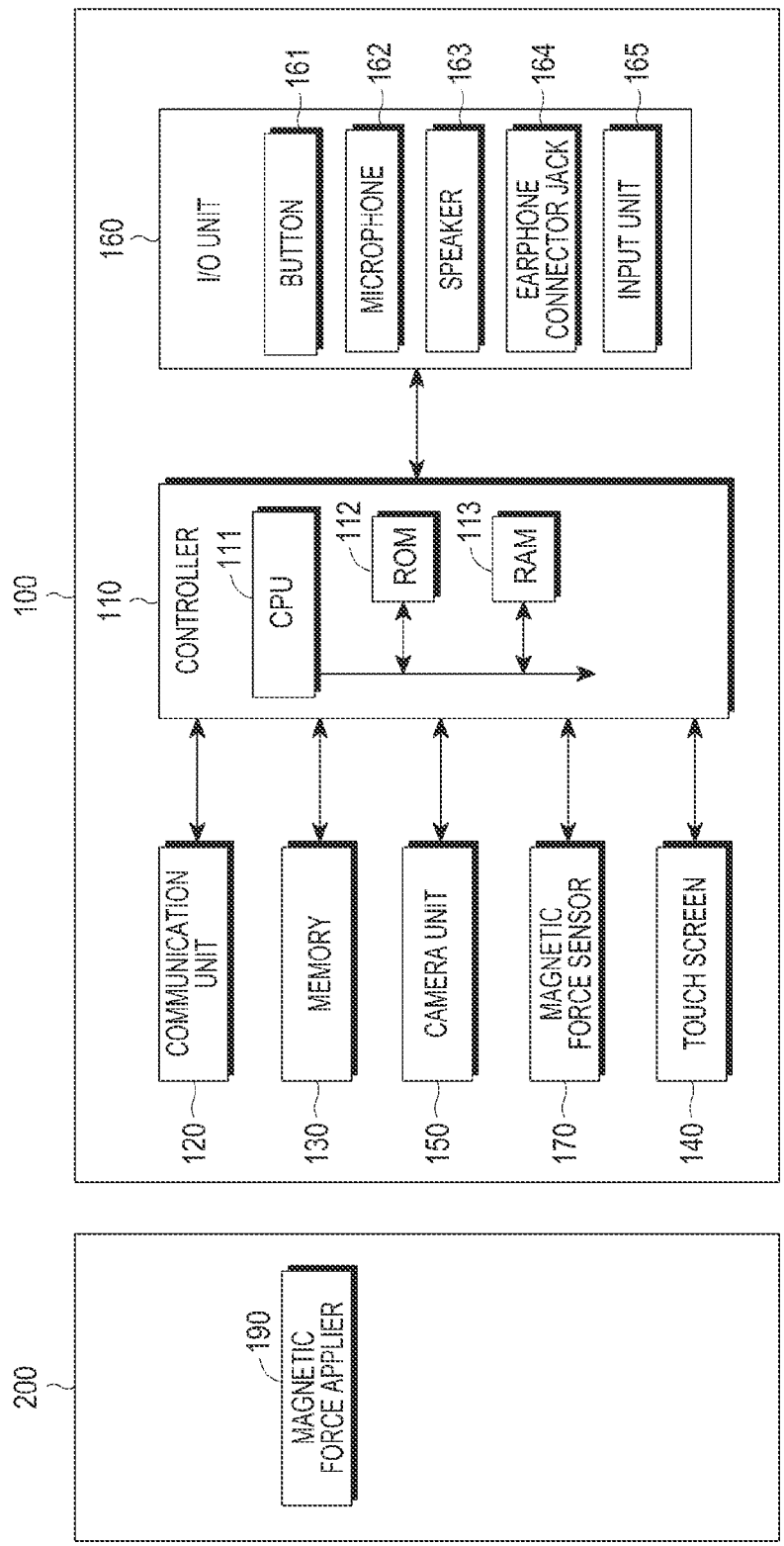
FIG. 5 is a block diagram of a cover and an electronic device according to embodiments of the present invention.

FIG. 5 is a block diagram of a cover and an electronic device according to embodiments of the present invention. As illustrated in FIG. 3, the cover 200 includes at least one magnetic force applier 190 that exerts a magnetic force distinguished from the strength of the Earth's magnetic field. The at least one magnetic force applier 190 is disposed at a position corresponding to a magnetic force sensor 170 of the electronic device 100.

The electronic device 100 includes the magnetic force sensor 170 that senses a magnetic force exerted from the magnetic force applier 190 as the electronic device 100 is inserted into the cover 200. The electronic device 100 further includes a controller 110, a communication unit 120, a memory 130, the touch screen 140, a camera unit 150, and an Input/Output (I/O) unit 160.

The controller 110 includes a Central Processing Unit (CPU) 111 or a processor, and includes a bus for information communication and the CPU 111 or processor connected to the bus, for processing information. The controller 110 further includes a Random Access Memory (RAM) 113 connected to the bus, as a first memory for storing information required by the CPU 111 or the processor. The RAM 113 may be used to store temporary information required by the CPU 111 or the processor. The controller 110 further includes a Read Only Memory (ROM) 112 connected to the bus, as a second memory for storing static information required by the CPU 111 or the processor.

The controller 110 controls the communication unit 120, the memory 130, the touch screen 140, the camera unit 150, and the I/O unit 160. For example, the controller 110 provides overall control to the electronic device 100 and controls a signal flow between the above components.

The controller 110 may define first and second areas on the touch screen 140, corresponding to the window area and the keyboard area of the front input unit 210. Specifically, the controller 110 determines whether the cover 200 covers the touch screen 140. If the cover 200 covers the touch screen 140, the controller 110 configures the first and second areas on the touch screen 140 in correspondence with the window area and the keyboard area of the cover 200 and controls display of a keypad related to contents displayed in the first area in the second area.

With the front cover unit 210 closed on the touch screen 140, the controller 110 activates the first and second areas of the touch screen 140, while deactivating the remaining area of the touch screen 140. The controller 110 detects user inputs applied to the first and second areas of the touch screen 140 through the front cover unit 210.

Upon sensing a magnetic force through the magnetic force sensor 170, the controller 110 determines whether the front cover unit 210 covers a display screen of the touch screen 140, that is, whether the cover 200 is open or closed.

The communication unit 120 connects the electronic device 100 to an external device (not shown) and communicates with the external device. The external device includes another device (not shown), a portable phone (not shown), a smartphone (not shown), a tablet PC (not shown), and a server (not shown). The communication unit 120 includes various communication modules such as a mobile communication module, a Near Field Communication (NFC) module, and a Bluetooth® module and communicates with an external device by various communication schemes such as mobile communication, NFC, and Bluetooth®.

The memory 130 stores input/output signals or data in accordance with steps of the controller 110, the communication unit 120, the touch screen 140, the camera unit 150, the I/O unit 160, and the magnetic force sensor 170 under the control of the controller 110. The memory 130 stores a plurality of programs for controlling the electronic device 100 or the controller 110, a plurality of applications, and programs and data for executing various functions. According to embodiments of the present invention, the memory 130 stores a keypad supporting algorithm that enables manipulation of at least one application through the keyboard area.

The keypad supporting algorithm may be software that enables display of different keypads in a partial area of the touch screen 140 corresponding to the keyboard area 205 of the cover 200, for different applications. For example, in a message application, when the cover 200 is closed, the controller 110 controls display of a character keypad in an area of the touch screen 140 corresponding to the keyboard area of the cover 200. When the cover 200 is open, the controller controls display of an execution screen of the message application in full screen on the touch screen 140, based on the keypad supporting algorithm.

The term "memory" includes the ROM 112 and the RAM 113 within the controller 110, or a memory card (for example, a Secure Digital (SD) card and a memory stick) mounted to the electronic device 100. The memory 130 includes, for example, a non-volatile memory, a volatile memory, a Hard Disk Drive (HDD), and a Solid State Drive (SSD).

The memory 130 may be a machine-readable medium such as a computer-readable medium. The machine-readable medium may be defined as a medium that provides data to a machine so that the machine may perform a specific function. The machine-readable medium may be a storage medium. The memory 130 may include a non-volatile medium and a volatile medium. All of these media should provide commands detectable to a physical device that reads commands to a machine. The machine-readable medium includes, but not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM.

The touch screen 140 provides various Graphical User Interfaces (GUIs) to a user. For example, the touch screen 140 may receive various gesture inputs including at least one touch input or proximity input through a user's body part (for example, a finger such as a thumb) or a touch input unit 165 (for example, a pen). The touch screen 140 may be implemented as, for example, a resistive type, a capacitive type, an ElectroMagnetic Resonance (EMR) type, or a combination thereof. According to embodiments of the present invention, the touch screen 140 displays screens such as execution screens of applications, a messenger screen, a message generation screen, a message reception screen, an outgoing call screen, and an incoming call screen under the control of the controller 110.

The touch screen 140 displays an execution screen of an application in a predetermined partial area of a display screen, such as the first area of the touch screen 140 corresponding to the window area 201*a*, while displaying a keypad in the second area of the touch screen 140 corresponding to the keyboard area 205, for manipulation of the application displayed in the first area, under the control of the controller 110 depending on whether the front cover unit 210 covers the display screen.

The I/O unit 160 includes, but is not limited to, a button 161, a microphone 162, a speaker 163, an earphone connector jack 164, and the input unit 165. A cursor control such as a mouse, a trackball, a joystick, or cursor directional keys may be provided for communication with the controller 110 and for control of cursor movement on the touch screen 140.

One or more buttons 161 are provided in the electronic device 100 and provide various input signals corresponding to a user's pressings to the controller 110.

The microphone 162 may receive a voice or a sound from various sound sources and convert the received voice or sound to an electrical signal under the control of the controller 110.

The speaker 163 may output sounds corresponding to various signals (for example, a wireless signal, a broadcast signal, a digital audio file, and a digital video file) along with execution of applications to the outside of the electronic device 100 under the control of the controller 110.

The input unit 165 is configured to be inserted and maintained inside the electronic device 100 or is separately configured. In the former case, the input unit 165 may be removed from or inserted into the electronic device 100. The input unit 165 may be a user's finger or an input means such as a stylus pen (hereinafter, referred to as a pen), which may apply a user input by approaching or touching the touch screen 140.

Figure 6:
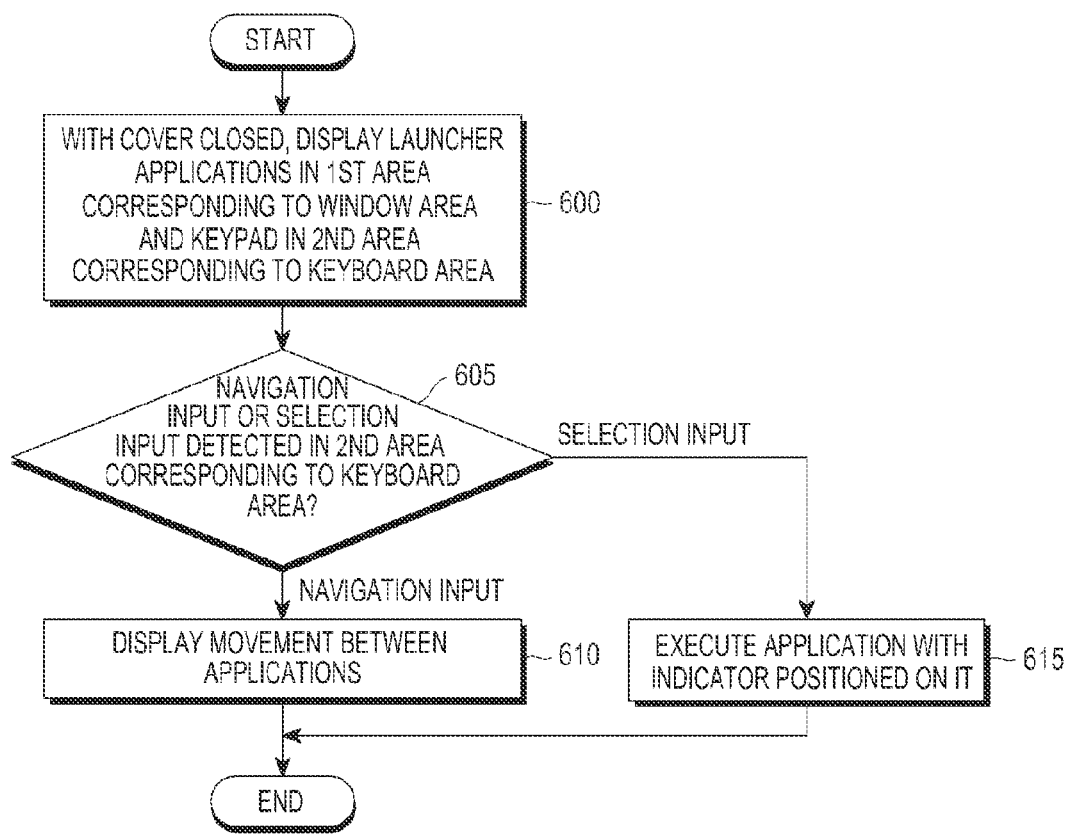
FIG. 6 is a flowchart illustrating an step for controlling an application on a display screen of an electronic device covered with a cover according to embodiments of the present invention.

FIG. 6 is a flowchart illustrating an step for controlling an application on a display screen of an electronic device covered with a cover according to embodiments of the present invention.

Referring to FIG. 6, with the cover 200 closed, the controller 110 displays launcher applications in the first area of the touch screen 140 corresponding to the window area 201*a* and a keypad in the second area of the touch screen 140 corresponding to the keyboard area 205 in step 600. The launcher applications may run based on the keyboard supporting algorithm and may be preset through functions such as registration and deletion by a user.

Figures 7A, 7B:
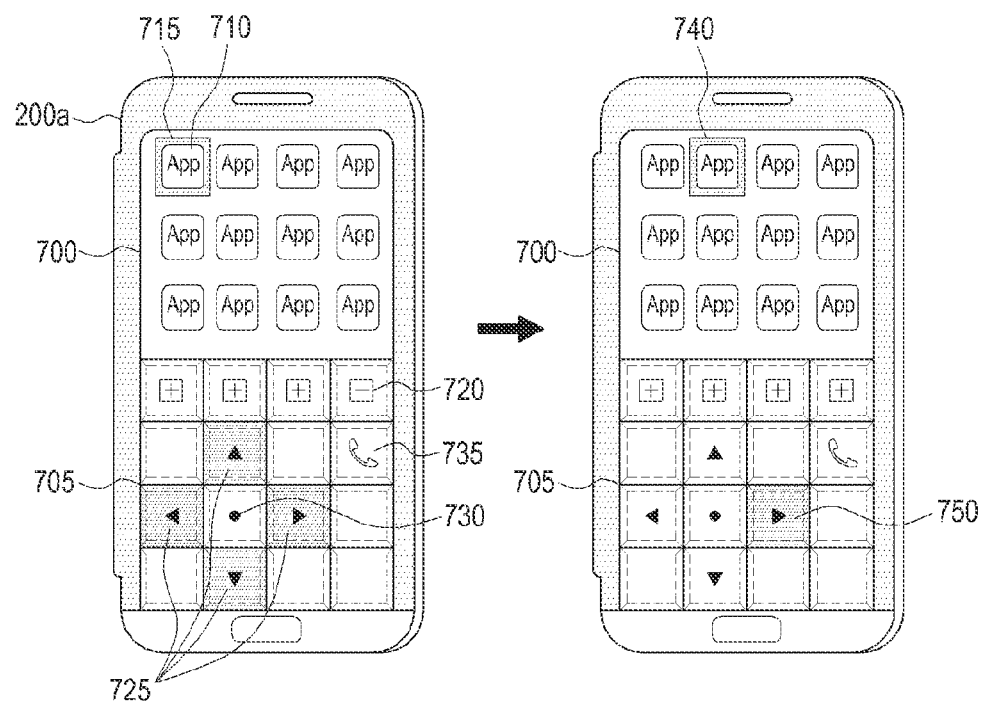
FIGS. 7A and 7B illustrate a screen for controlling launcher applications in an electronic device according to embodiments of the present invention.

FIGS. 7A and 7B illustrate a launcher application control screen in an electronic device according to embodiments of the present invention. Being covered with the cover 200, the touch screen 140 may output a screen divided into a first area and a second area. The first area may be exposed through a window area 700 and the second area may be projected through a keyboard area 705. A plurality of applications may be displayed in the first area corresponding to the window area 700, whereas a keypad may be displayed in the second area corresponding to the keyboard area 705, to manipulate these applications.

Referring to FIG. 7A, a plurality of launcher applications are displayed in the first area corresponding to the window area 700 and a keypad is displayed in the second area corresponding to the keyboard area 705, for manipulation of the launcher applications. For example, at least one reserved key 720, directional keys 725, an OK key 730, and a call key 735 are displayed in the second area corresponding to the keyboard area 705, as an example of the keypad with which to manipulate the launcher applications. The call key 735 may be used to make a call or search for a contact. The directional keys 725 include four-direction keys, that is, up, down, left, and right directional keys, to move an indicator between applications. The OK key 730 disposed at the center of the directional keys 725 may be a command execution button to execute an intended application, when the indicator is positioned on the application.

Returning to FIG. 6, in step 605, the controller 110 determines whether a navigation input or a selection input has been detected in the second area corresponding to the keyboard area 705. Upon detection of a navigation input, the controller 110 displays movement between applications in step 610. However, upon detection of a selection input, the controller 110 executes an application on which the indicator is positioned in step 615.

A screen displaying a plurality of launcher applications is provided to a user as illustrated in FIG. 7A. An indicator 715 may indicate a current application 710 of interest according to a user input applied through the keyboard area 705. The indicator 715 may be configured as a changing color of the outline of an application or a shade of the application.

In FIG. 7B, a user moves an indicator 740 from one application to another application using a directional key 750. The user may execute an application indicated by the indicator 740 by applying a selection input, that is, by pressing a part of the keyboard area 705 corresponding to the OK key 730. While the keypad needed to manipulate launcher applications is shown in FIGS. 7A and 7B as including the at least one reserved key 720, the directional keys 725, the OK key 730, and the call key 735, this is purely an example and thus should not be construed as limiting the present invention. That is, the keypad may have a different configuration on the launcher application screen.

In FIG. 7A, the at least one reserved key 720 refers to a key to which any specific usage is not assigned and is available as a hot key, which may be set for a frequently used application. While at least four hot keys are shown in FIG. 7A, the number of hot keys is unlimited.

FIGS. 8A, 8B, and 8C illustrate a hot key setting screen according to embodiments of the present invention. Referring to FIG. 8A, reserved keys 810 are projected through a keyboard area 805 in a cover 200*b* including a window area 800 and the keyboard area 805. A user may set a hot key by pressing a part of the keyboard area 805 corresponding to a reserved key 810 for a predetermined time. Upon detection of a user input in the part of the keyboard area 805 corresponding to the reserved key 810, the electronic device 100 displays an application list 815 in a first area of the touch screen 140 corresponding to the window area 800 as illustrated in FIG. 8B.

The application list 815 includes applications running based on the keyboard supporting algorithm according to embodiments of the present invention. Therefore, the user may set a hot key by selecting an application in the application list 815. Alternatively or additionally, the user may set an application corresponding to a hot key by search. FIG. 8C illustrates when a hot key 820 has been set for a camera application.

Figure 9A:
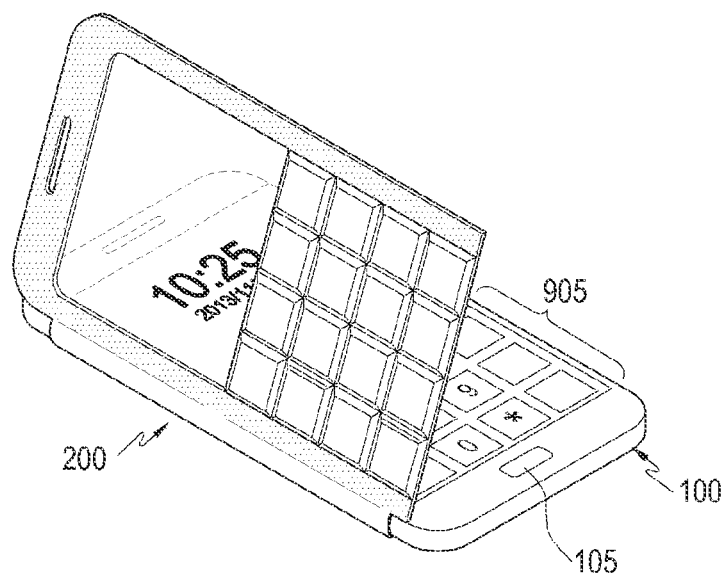
FIGS. 9A and 9B illustrate a locking screen for an electronic device according to embodiments of the present invention.
Figure 9B:
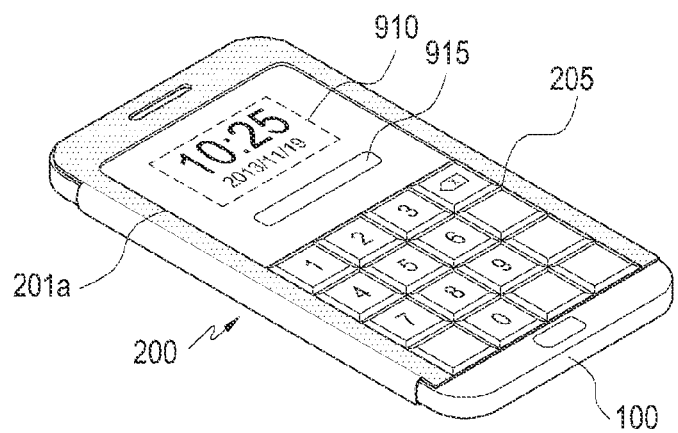

FIGS. 9A and 9B illustrate a locking screen in an electronic device according to embodiments of the present invention.

FIG. 9A illustrates a keypad displayed in a second area 905 of the touch screen 140 corresponding to the keyboard area of the cover 200, while the cover 200 is being opened. As illustrated in FIG. 9B, a text bar 915 for inputting a password as well as a current time and date 910 may be displayed in a first area of the touch screen 140 corresponding to the window area 201*a* on the locking screen. A numerical keypad for inputting a password may be displayed in the second area corresponding to the keyboard area 205.

Figure 10:
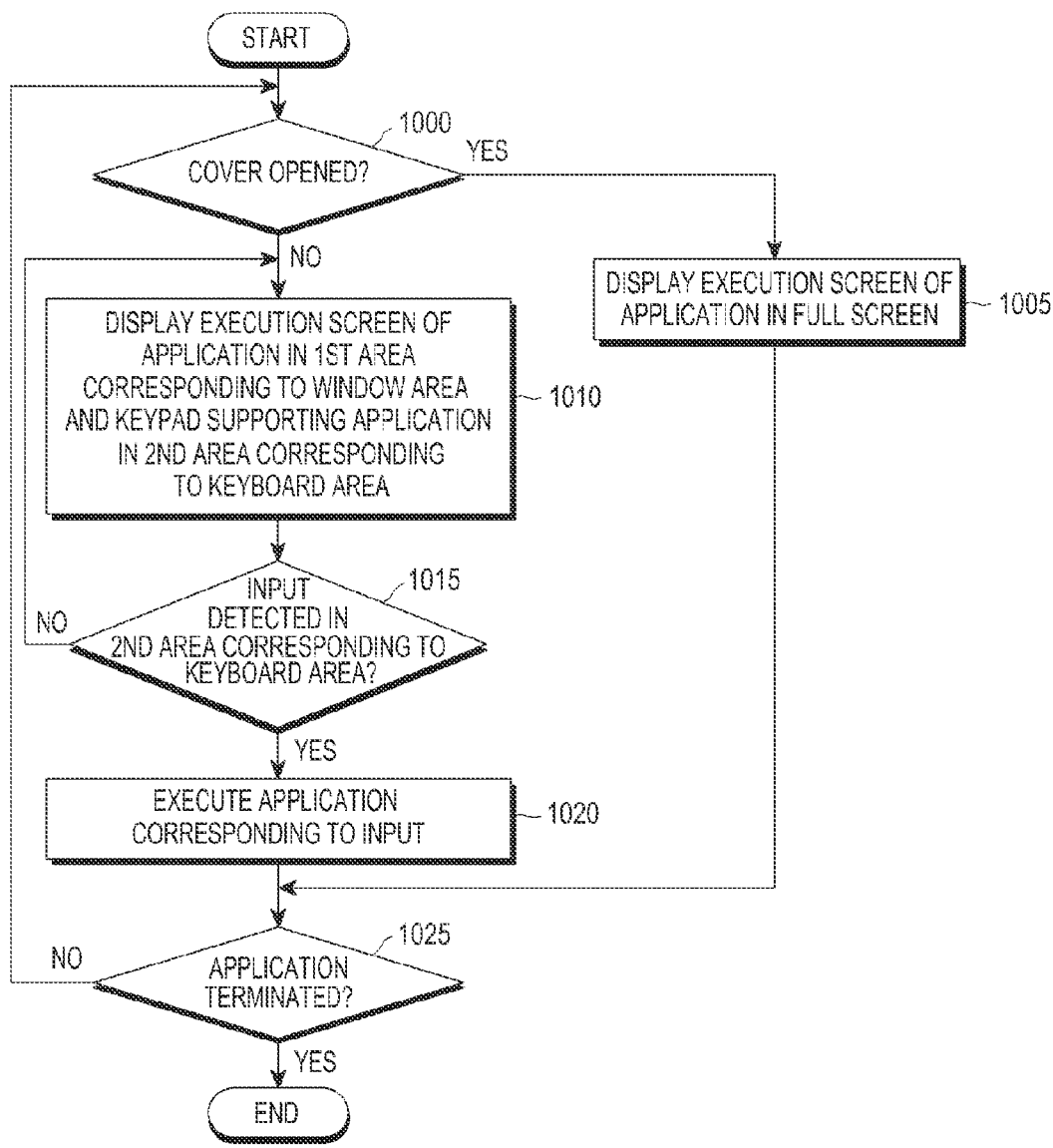
FIG. 10 is a flowchart illustrating an step for controlling a display screen depending on whether a cover of an electronic device is open or closed according to embodiments of the present invention.

FIG. 10 is a flowchart illustrating a process for controlling a display screen depending on whether a cover of an electronic device is open or closed according to embodiments of the present invention.

Referring to FIG. 10, the controller 110 determines, based on a signal received from the magnetic force sensor 170, whether the cover 200 is open in step 1000. If the cover 200 is open, the controller 110 displays an execution screen of an application in full screen in step 1005. In this case, the controller 110 may activate a display screen of the touch screen 140 to sense a touch input.

However, if the cover 200 is not open, that is, the cover 200 is closed, the controller 110 displays an execution screen of an application in the first area of the touch screen 140 corresponding to the window area 201*a* and a keypad supporting the application in the second area of the touch screen corresponding to the keyboard area 205 in step 1010. In step 1015, the controller 110 determines whether an input has been detected in the second area corresponding to the keyboard area 205. Upon detection of an input in the second area corresponding to the keyboard area 205, the controller 110 performs an application step corresponding to the input in step 1020. For example, upon sensing a user input through pressing in the second area corresponding to the keyboard area 205, the controller 110 performs a keypad funcation corresponding to a position at which the user input has been generated. If the application is still running in step 1025, the controller 110 returns to step 1000 and repeats the above procedure.

Figures 11A, 11B:
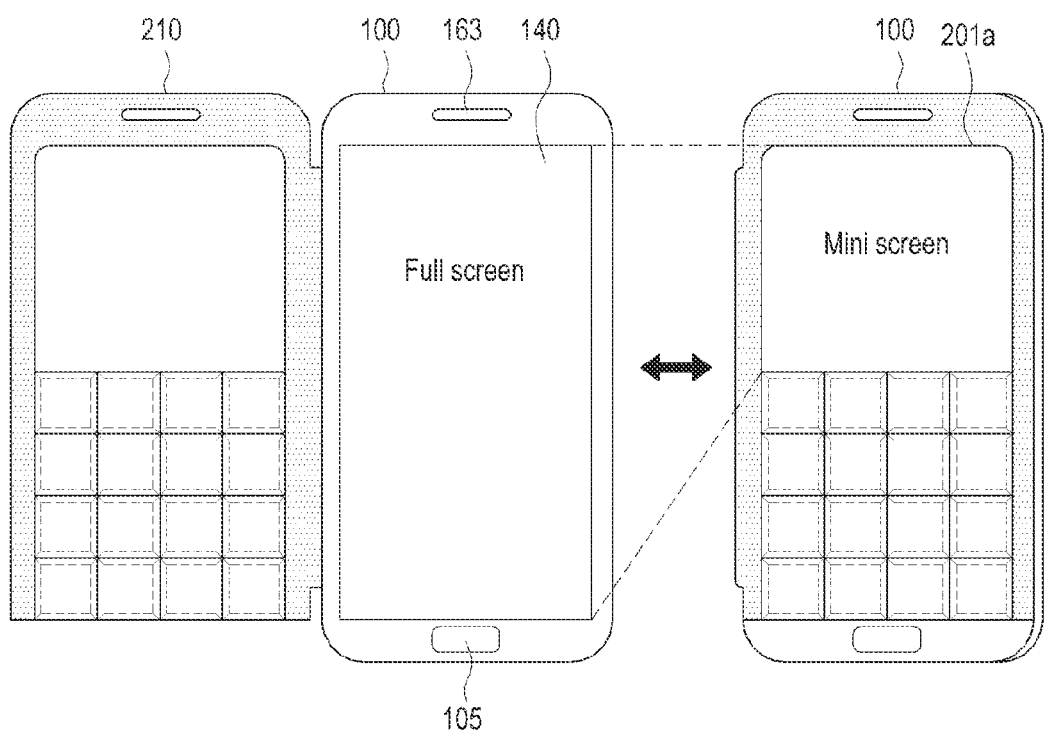
FIGS. 11A and 11B illustrate a full screen and a mini screen that are provided depending on whether a cover is open or closed according to embodiments of the present invention.

FIGS. 11A and 11B illustrate a full screen and a mini screen that are provided depending on whether a cover is open or closed according to embodiments of the present invention.

Referring to FIG. 11A, as the front cover unit 210 is open, a full screen is displayed on the touch screen 140. When the front cover unit 210 is then closed, the full screen may switch to a mini screen on the touch screen 140 and then displayed in the first area of the touch screen 140 corresponding to the window area 201*a*, as illustrated in FIG. 11B. In the opposite case, as the front cover unit 210 is closed, the mini screen is displayed in the first area of the touch screen 140 corresponding to the window area 201*a* as illustrated in FIG. 11B. When the front cover unit 210 is then opened, the mini screen switches to the full screen on the touch screen 140, as illustrated in FIG. 11A. When the mini screen is displayed in the first area corresponding to the window area 201*a* in the closed state of the front cover unit 210, a keypad related to the mini screen is displayed in the second area corresponding to the keyboard area 205.

Figure 12:
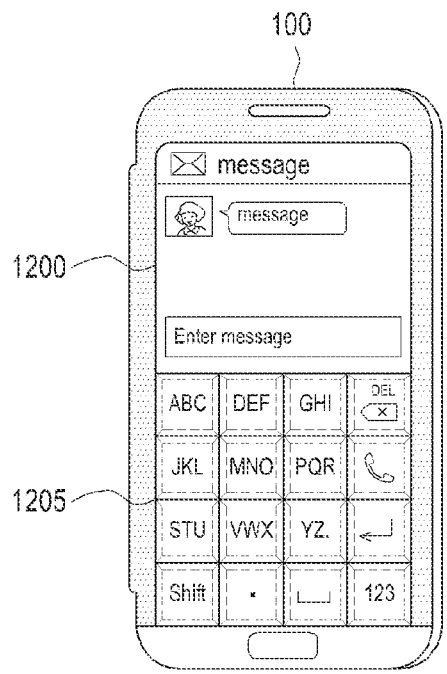
FIG. 12 illustrates a keypad projected onto a keyboard area of a cover that supports a message application according to embodiments of the present invention.

FIG. 12 illustrates a keypad projected in a keyboard area of a cover that supports a message application according to embodiments of the present invention.

Referring to FIG. 12, as the electronic device 100 is covered with the cover, an execution screen of a message application is resized to match a window area 1200. A keypad related to the resized message application screen is projected through a keyboard area 1205. The keypad projected through the keypad area 1205 includes at least one button. This keypad includes at least one character key for writing a message, at least one numerical key, a delete key, a space key, an enter key, and a call key. The keypad may further include a function key such as a Korean-English switch key.

A plurality of keys may be arranged in a keypad displayed on the touch screen 140 in such a manner that even though the front cover unit 210 is closed, the keyboard area of the front cover unit 210 may be readily used, in the manner of a software keyboard.

Figure 13:
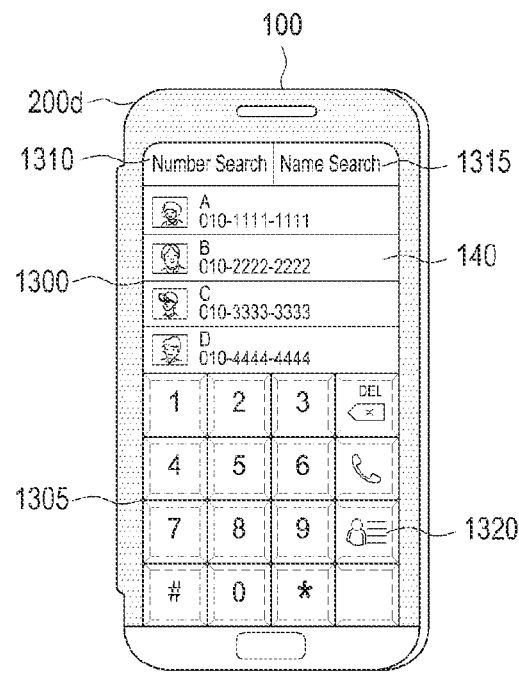
FIG. 13 illustrates a keypad projected onto a keyboard area of a cover that supports a call manager application according to embodiments of the present invention.

FIG. 13 illustrates a keypad projected in a keyboard area of a cover that supports a call manager application according to embodiments of the present invention. In FIG. 13, along with execution of the call manager application, a call manager screen is displayed using the first and second areas of the touch screen 140.

Referring to FIG. 13, with a cover 200*d* closed, call information may be displayed in the first area corresponding to a window area 1300 of the cover 200*d*, whereas a keypad supporting the call manager application may be displayed in the second area corresponding to a keyboard area 1305 of the cover 200*d*. The call information includes, for example, a number search function 1310 for searching for a contact, a name search function 1315, and a contact list.

In FIG. 13, the keypad includes at least one numerical key. This keypad differs from the keypad related to the locking screen in FIG. 9. That is, the keypad of FIG. 13 includes special keys such as "*" and '#' as well as the at least one numerical key needed for executing the call manager application. According to embodiments of the present invention, the keypad may further include a function key other than the afore-mentioned keys. For example, a hot function key 1320 is shown as such a function key in FIG. 13. The hot function key 1320 may be used to dial a preset number by a long click.

Figure 14:
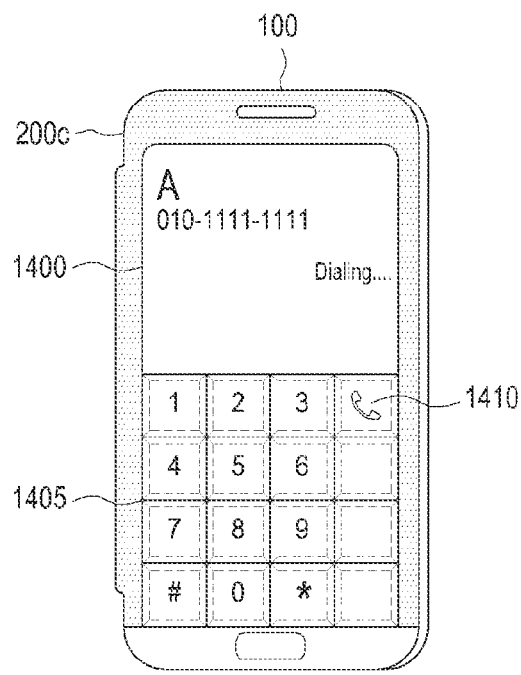
FIGS. 14 and 15 illustrate keypads projected onto a keyboard area of a cover in the event of call origination and call termination, respectively, according to embodiments of the present invention.
Figure 15:
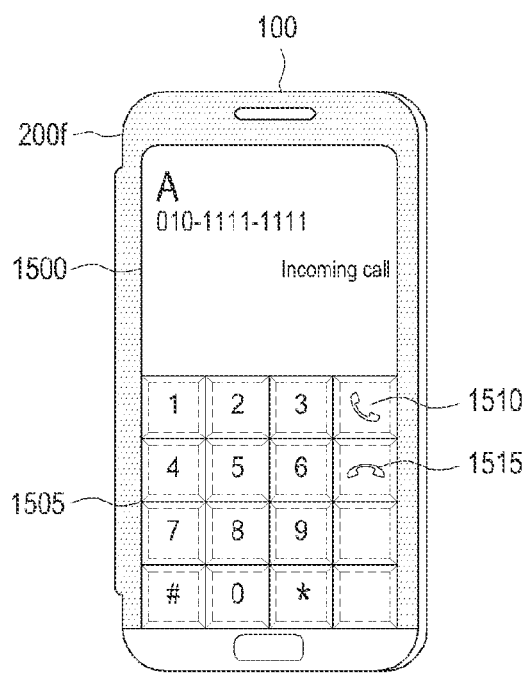

FIGS. 14 and 15 illustrate keypads projected in a keyboard area of a cover in the event of call origination and call termination, respectively, according to embodiments of the present invention.

Referring to FIG. 14, with a cover 200*c* closed, such information as the name, contact number, and outgoing call state of a called party may be displayed in a first area corresponding to a window area 1400 of the cover 200*c*, while keys 1410 for call origination may be displayed in a second area corresponding to a keyboard area 1405 of the cover 200*c*. An end key may further be displayed in the second area, for cancelling an outgoing call.

Referring to FIG. 15, with a cover 200*f* closed, such information as an incoming call state and the name and contact number of a caller may be displayed in a first area corresponding to a window area 1500 of the cover 200*f*. An end key 1515 for rejecting an incoming call as well as a call connection key 1510 may be displayed in a second area corresponding to a keyboard area 1505 of the cover 200*f*.

Figure 16:
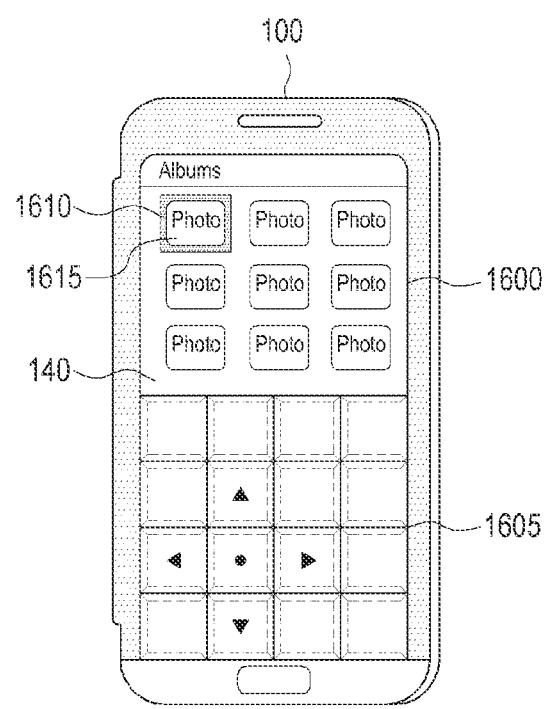
FIG. 16 illustrates a keypad projected onto a keyboard area of a cover that supports a gallery application according to embodiments of the present invention.

FIG. 16 illustrates a keypad projected in a keyboard area of a cover that supports a gallery application according to embodiments of the present invention. In FIG. 16, along with execution of the gallery application, an image preview screen is displayed using the first and second areas of the touch screen 140.

Referring to FIG. 16, at least one image 1615 may be displayed in a first area corresponding to a window area 1600, while a keypad may be displayed in a second area corresponding to a keyboard area 1605, for moving from one image to another and selecting an image. Such keys as directional keys, an OK key, and a call key may be displayed as a keypad for manipulating items related to the gallery application in the second area corresponding to the keyboard area 1605. An indicator 1610 indicating selection of an image 1615 may move to another image in correspondence with a directional key input.

As described above, the front surface of a flip cover includes a window area in which a part of a display screen of an electronic device is projected and a keyboard area in which another area of the display screen is projected according to embodiments of the present invention. This keyboard area is configured so that a keypad displayed on the touch screen 140 may be projected in the keyboard area. Thus, with the cover closed, a key input may be applied to the keypad through the keypad area. Accordingly, when the present invention is implemented in conjunction with software, a feature phone and a smartphone may be used in combination simply by a user's action of opening and closing the flip cover. While the flip cover is closed, the user may experience a tactile sense of keys by pressing an intended one of a plurality of square buttons in the keyboard area.

The disclosed electronic device, UI method in the electronic device, and cover of the electronic device may be implemented as computer-readable code in a computer-readable recording medium. The computer-readable recording medium includes any type of recording device storing computer-readable data. Examples of the recording medium include Read Only Memory (ROM), Random Access Memory (RAM), optical disk, magnetic tape, floppy disk, hard disk, non-volatile memory, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, in embodiments of the present invention, a physical keyboard of a detachable cover is provided so that a user of a full-touch electronic device may apply a fast, accurate input.

According to embodiments of the present invention, a display screen may be divided into areas corresponding to a window area and a keyboard area of a cover. As a keypad supporting an application executed in the area of the display screen corresponding to the window area of the cover can be projected in the keyboard area of the cover, keypads supporting various applications are provided.

According to embodiments of the present invention, since a keypad configured to project a display screen of an electronic device is formed on a cover, a user can readily select a keypad input scheme by merely opening or closing the cover.

According to embodiments of the present invention, a smartphone operating in a touch screen input scheme can be controlled using a keypad such as that of a feature phone. Therefore, a user familiar with a conventional key button scheme can readily use the smartphone.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An electronic device comprising:
a touch screen; and
a controller configured to:
  determine whether a cover covers the touch screen,
  define a first area and a second area on the touch screen, respectively, in correspondence with a window area and a keyboard area of the cover, in response to the cover being closed and covering the touch screen, wherein keys in the keyboard area are formed into square grids to align with the cover,
  control display of a keypad in the second area related to contents displayed in the first area, wherein the keypad includes a reserved key,
  receive a first user input on the reserved key,
  control display of a plurality of functions and associated icons in the first area, in response to the first user input on the reserved key,
  receive a second user input selecting a function among the plurality of functions displayed in the first area, and
  control display of an icon corresponding to the selected function in the reserved key in the second area,
  wherein the touch screen is displayed through the cover, and
  wherein one key of the keypad exists per grid square of the cover.

2. The electronic device of claim 1, wherein upon sensing the first user input in the keyboard area, the controller is further configured to determine a part of the keypad corresponding to a position of the sensed input and to control performing of a key manipulation corresponding to the determined part of the keypad.

3. The electronic device of claim 1, wherein when the cover covers the touch screen, the controller is further configured to control display of at least one application in the first area corresponding to the window area and display of a keypad supporting the at least one application in the second area corresponding to the keyboard area.

4. The electronic device of claim 3, wherein upon detection of a navigation input in the second area corresponding to the keyboard area, the controller is further configured to control display of movement between the at least one application, and upon detection of a selection input in the second area corresponding to the keyboard area, the controller is further configured to execute an application on which an indicator is positioned.

5. The electronic device of claim 4, wherein upon execution of the application on which the indicator is positioned, the controller is further configured to control display of an execution screen of the application in the first area corresponding to the window area, and display of a keypad supporting the application in the second area corresponding to the keyboard area.

6. The electronic device of claim 5, wherein when the cover is opened, the controller is further configured to control display of the execution screen of the application in full screen.

7. The electronic device of claim 1, further comprising a magnetic force sensor configured to detect a magnetic force generated when the cover covers the touch screen.

8. The electronic device of claim 1, wherein the cover comprises:
a front cover unit configured to cover the touch screen formed on a front surface of the electronic device; and
a rear cover unit configured to cover a rear surface of the electronic device, wherein the front cover unit includes a transparent or semi-transparent window area and the keyboard area formed of a transparent material, and with the front cover unit covering the touch screen of the electronic device, the keyboard area includes square grids in which a keypad of the electronic device is projected.

9. The electronic device of claim 8, further comprising a magnetic force applier configured to generate a magnetic force at a position corresponding to a magnetic force sensor of the electronic device that detects the magnetic force generated when the front cover unit covers the touch screen.

10. The electronic device of claim 8, wherein squares are arranged in a 4×4 layout in the keyboard area, the 4×4 layout including 4 squares horizontally and vertically arranged, respectively.

11. The electronic device of claim 8, wherein the keypad of the electronic device is related to contents displayed in a first area of the touch screen corresponding to the window area.

12. The electronic device of claim 1, wherein the first user input comprises a user pressing the reserved key for a predetermined amount of time.

13. A User Interface (UI) method in an electronic device, the UI method comprising:
  determining whether a cover covers a touch screen of the electronic device;
  defining a first area and a second area on the touch screen, respectively, in correspondence with a window area and a keyboard area of the cover, in response to the cover being closed and covering the touch screen, wherein keys in the keyboard area are formed into square grids to align with the cover;
  displaying a keypad related to contents displayed in the first area in the second area, wherein the keypad has a reserved key;
  receiving a first user input on the reserved key;
  displaying a plurality of functions and associated icons in the first area, in response to the first user input on the reserved key;
  receiving a second user input selecting a function among the plurality of functions displayed in the first area; and
  displaying an icon corresponding to the selected function in the reserved key in the second area,
  wherein the touch screen is displayed through the cover, and wherein one key of the keypad exists per grid square of the cover.

14. The UI method of claim 13, further comprising:
  determining, upon sensing the first user input in the keyboard area, a part of the keypad corresponding to a position of the sensed input; and
  performing a key manipulation corresponding to the determined part of the keypad.

15. The UI method of claim 13, wherein displaying the keypad related to contents displayed in the first area comprises:
  displaying, when the cover covers the touch screen, at least one application in the first area corresponding to the window area; and
  displaying a keypad supporting the at least one application in the second area corresponding to the keyboard area.

16. The UI method of claim 15, further comprising:
  displaying, upon detection of a navigation input in the second area corresponding to the keyboard area, movement between the at least one application; and
  executing, upon detection of a selection input in the second area corresponding to the keyboard area, an application on which an indicator is positioned.

17. The UI method of claim 16, further comprising displaying, when the cover is opened from a closed state, the execution screen of the application in full screen.

18. The UI method of claim 13, wherein the first user input comprises a user pressing the reserved key for a predetermined amount of time.

* * * * *